US011138302B2

(12) United States Patent
Figueredo de Santana et al.

(10) Patent No.: US 11,138,302 B2
(45) Date of Patent: Oct. 5, 2021

(54) ACCESS CONTROL USING MULTI-AUTHENTICATION FACTORS

(71) Applicant: INTERNATIONAL BUSINESS MACHINES CORPORATION, Armonk, NY (US)

(72) Inventors: Vagner Figueredo de Santana, Sao Paulo (BR); Allysson Flavio Melo de Oliveira, Sao Paulo (BR); Andrea Britto Mattos Lima, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/287,591

(22) Filed: Feb. 27, 2019

(65) Prior Publication Data
US 2020/0272717 A1    Aug. 27, 2020

(51) Int. Cl.
*G06F 21/00* (2013.01)
*G06F 21/32* (2013.01)
(Continued)

(52) U.S. Cl.
CPC ......... *G06F 21/32* (2013.01); *G06K 9/00288* (2013.01); *G06K 9/00335* (2013.01); *H04L 63/0861* (2013.01); *H04L 63/102* (2013.01)

(58) Field of Classification Search
CPC ... G06F 21/32; H04L 63/102; H04L 63/0861; G06K 9/00288; G06K 9/00335
See application file for complete search history.

(56) References Cited

U.S. PATENT DOCUMENTS 8,380,247 B2   2/2013   Engstrom
8,856,541 B1   10/2014  Chaudhury et al.
(Continued)

FOREIGN PATENT DOCUMENTS

CN    101520844 B    5/2012
CN    105205455 A    12/2015
(Continued)

OTHER PUBLICATIONS

Aarts et al., "Non-Contact Heart Rate Monitoring Utilizing Camera Photoplethysmography in the Neonatal Intensive Care Unit—A Pilot Study," Early Human Development, Dec. 2013, p. 943-948, vol. 89, Issue 12, Elsevier Ireland Ltd.
(Continued)

*Primary Examiner* — Jeffrey C Pwu
*Assistant Examiner* — William A Corum, Jr.
(74) *Attorney, Agent, or Firm* — Rakesh Roy

(57) ABSTRACT

A method, computer system, and a computer program product for access control is provided. The present invention may include requesting a random gesture challenge, wherein the requested random gesture challenge includes an expected response associated with an authorized user. The present invention may include, in response to receiving a video data, determining whether the received video data includes a user response matching the expected response. The present invention may include determining whether a first heartbeat signal of a user matches a second heartbeat signal measured based on the received video data. The present invention may include, in response to determining a first match between the user response included in the received video data and the expected response and a second match between the first heartbeat signal and the second heartbeat signal, authenticating the user as the authorized user of the user device.

17 Claims, 8 Drawing Sheets

(51) Int. Cl.
*H04L 29/06* (2006.01)
*G06K 9/00* (2006.01)

(56) References Cited

U.S. PATENT DOCUMENTS

| | | |
|---|---|---|
| 9,119,539 B1 | 9/2015 | Dotan et al. |
| 9,510,196 B2 | 11/2016 | Sensharma et al. |
| 9,953,231 B1* | 4/2018 | Medina, III ............ G06F 21/32 |
| 10,225,737 B1* | 3/2019 | Mulders ................ H04W 12/06 |
| 2007/0183633 A1 | 8/2007 | Hoffmann |
| 2008/0192980 A1 | 8/2008 | Park et al. |
| 2008/0253626 A1 | 10/2008 | Shuckers et al. |
| 2010/0036783 A1 | 2/2010 | Rodriguez |
| 2010/0131273 A1 | 5/2010 | Aley-Raz et al. |
| 2010/0229223 A1 | 9/2010 | Shepard et al. |
| 2012/0246737 A1 | 9/2012 | Paxton et al. |
| 2013/0015946 A1 | 1/2013 | Lau et al. |
| 2013/0188840 A1 | 7/2013 | Ma et al. |
| 2013/0336547 A1 | 12/2013 | Komogortsev |
| 2014/0337930 A1 | 11/2014 | Hoyos et al. |
| 2015/0154392 A1 | 6/2015 | Bao et al. |
| 2015/0264567 A1* | 9/2015 | Sensharma ............ H04W 12/06 455/411 |
| 2015/0326570 A1* | 11/2015 | Publicover .............. G06F 21/64 726/4 |
| 2016/0117544 A1 | 4/2016 | Hoyos et al. |
| 2016/0328623 A1* | 11/2016 | Kim .................. G06K 9/00228 |
| 2016/0371555 A1 | 12/2016 | Derakhshani et al. |
| 2017/0039440 A1 | 2/2017 | Li et al. |
| 2017/0124394 A1 | 5/2017 | Thavalengal |
| 2017/0158202 A1 | 6/2017 | Yang |
| 2018/0089407 A1* | 3/2018 | Watson .................... G10L 17/24 |
| 2018/0239955 A1* | 8/2018 | Rodriguez ........... G06K 9/0061 |
| 2019/0050943 A1* | 2/2019 | Conradie ........... G06K 9/00268 |

FOREIGN PATENT DOCUMENTS

| | | |
|---|---|---|
| JP | 2008073462 A | 4/2008 |
| KR | 1020040019438 A | 3/2004 |
| KR | 101783713 B1 | 10/2017 |
| WO | 2015188410 A1 | 12/2015 |

OTHER PUBLICATIONS

Balakrishnan et al., "Detecting Pulse from Head Motions in Video," IEEE Conference on Computer Vision and Pattern Recognition, 2013, p. 3430-3437, IEEE Computer Society.

Chakraborty et al., "An Overview of Face Liveness Detection," International Journal on Information Theory (IJIT), Apr. 2014, p. 11-25, vol. 3, No. 2.

Kitajima et al., "Heart Rate Estimation Based on Camera Image," International Conference on Intelligent Systems Design and Applications (ISDA), 2014, p. 50-55.

Kwon et al., "Validation of Heart Rate Extraction Using Video Imaging on a Built-In Camera System of a Smartphone," 34th Annual International Conference of the IEEE EMBS, Aug. 28-Sep. 1, 2012, p. 2174-2177, San Diego, California, USA.

Mell et al., "The NIST Definition of Cloud Computing," National Institute of Standards and Technology, Sep. 2011, p. 1-3, Special Publication 800-145.

Poh et al., "Validation of a Standalone Smartphone Application for Measuring Heart Rate Using Imaging Photoplethysmography," Telemedicine and e-Health, Aug. 2017, p. 1-2, Abstract Only, https://www.liebertpub.com/doi/abs/10.1089/tmj.2016.0230?rfr_dat=cr_pub, Accessed on Feb. 26, 2019.

Poh et al., "Non-Contact, Automated Cardiac Pulse Measurements Using Video Imaging and Blind Source Separation," Optics Express, May 10, 2010, p. 10762-10774, vol. 18, No. 10, Optical Society of America.

Suwajanakorn et al., "Synthesizing Obama: Learning Lip Sync from Audio," ACM Transactions on Graphics, Jul. 2017, p. 1-13, vol. 36, No. 4, Article 95.

* cited by examiner

ACCESS CONTROL USING MULTI-AUTHENTICATION FACTORS

BACKGROUND

The present invention relates generally to the field of computing, and more particularly to security technology.

Various systems and transactions incorporate an authentication process to limit access to authorized users or parties. Some transactions (e.g., loans and other financial transactions) may require a user to provide "proof of life" in order to prove that the user is not falsely representing an authorized user. For example, the user may be required to appear in-person at a requesting third-party or a civil registry office and reproduce a handwritten signature of the authorized user. Other systems and transactions include technology-based authentication. However, current authentication technologies may include vulnerabilities which may be exploited to gain unauthorized access to a secured system.

SUMMARY

Embodiments of the present invention disclose a method, computer system, and a computer program product for access control. The present invention may include requesting a random gesture challenge, wherein the requested random gesture challenge includes an expected response associated with an authorized user. The present invention may include, in response to receiving a video data, determining whether the received video data includes a user response matching the expected response. The present invention may include determining whether a first heartbeat signal of a user matches a second heartbeat signal measured based on the received video data during the challenge gesture. The present invention may include, in response to determining a first match between the user response included in the received video data and the expected response and a second match between the first heartbeat signal and the second heartbeat signal, authenticating the user as the authorized and alive user of the user device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
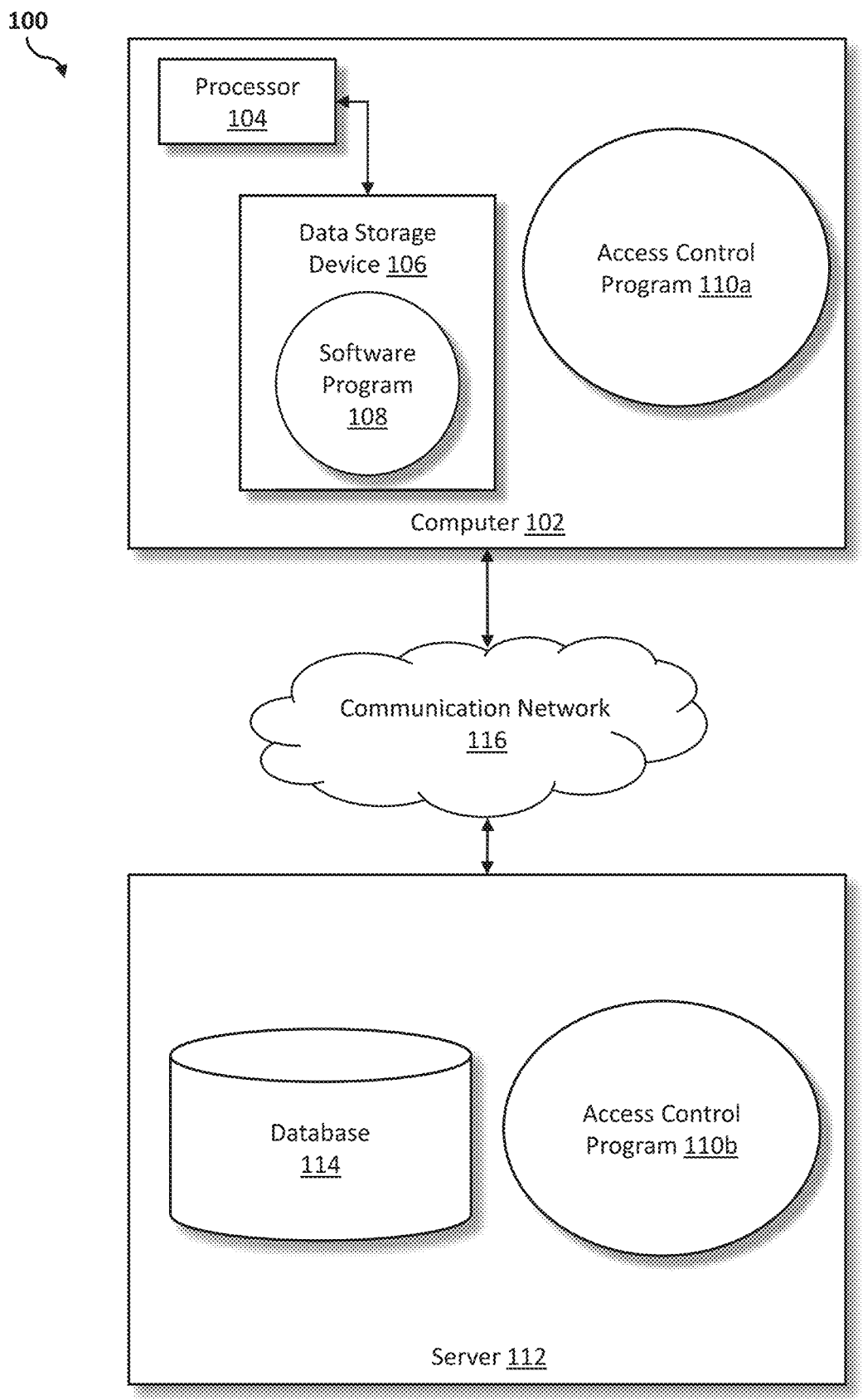
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for authenticating a user for access to a secured computing functionality (e.g., mobile application). As such, the present embodiment has the capacity to improve the technical field of authentication by detecting that an end user is both alive and authorized to access a secured computing functionality, thereby preventing wrongful authentication of an unauthorized user exploiting spoofing techniques. More specifically, an access control program may be implemented into a user device including multiple image capturing components. When a user interacts with the user device to gain access to the secured computing functionality, the access control program may engage a first image capturing component of the user device to perform facial recognition of the user based on the received facial video stream. In one embodiment, the access control program may process the received facial video stream to compute a first heartbeat signal characteristic (e.g., frequency) for the user, while the user performs a random challenging gesture. Then, the access control program may compute a second heartbeat signal characteristic (e.g., frequency) for the user based on one or more data received from a second image capturing component of the user device interacting with a finger of the user. Thereafter, the access control program may compare the first heartbeat signal and the second heartbeat signal to determine a matching heartbeat frequency. In response to identifying an authorized user face in the received facial video stream and detecting liveness from the matching heartbeat frequency, the access control program may determine that the user is both alive and an authorized user. Accordingly, the access control program may authenticate the user for access to the secured computing functionality.

As previously described, various systems and transactions incorporate an authentication process to limit access to authorized users or parties. Some transactions (e.g., loans and other financial transactions) may require a user to provide "proof of life" in order to prove that the user is not falsely representing an authorized user. For example, the user may be required to appear in-person at a requesting third-party or a civil registry office and reproduce a handwritten signature of the authorized user. Other systems and transactions include technology-based authentication. However, current authentication technologies may include vulnerabilities which may be exploited to gain unauthorized access to a secured system.

Current approaches may include image-based authentication technologies that perform facial recognition/identification from static images via computer-vision. However, a malicious user may implement spoofing techniques (e.g., by uploading a static photo of a third person, such as the authorized user) in order to falsely represent the authorized user and gain unauthorized access to a secured system.

Other approaches may include video-based authentication technologies that capture a video stream of the user performing facial gestures (e.g., perform a facial expression or pronounce a sentence), which is then compared to a reference video. However, with the advance of deep learning models (e.g., Generative Adversarial Networks (GANs)), video information may also be subject to spoofing techniques. In some instances, a malicious user may use a GAN model to automatically generate customized videos of the authorized user (e.g., performing facial gestures) in order to falsely represent the authorized user and gain unauthorized access to a secured system.

Therefore, it may be advantageous to, among other things, provide a way to prove that a user is a living person and is in fact the authorized user currently trying to authenticate a transaction by using physiological traces (e.g., biometrics) and computer vision based on data received by a mobile or other computer device.

According to at least one embodiment, a system, method, and program product for multimodal biometric authentication may be provided by the access control program. The access control program may be implemented into a user device having multiple image capturing components. In one embodiment, the access control program may engage a front camera component and a rear camera component of a mobile device to execute liveness detection and authentication of the user. The front camera component may be engaged by the access control program to perform facial recognition or identification of the user while the user performs a random challenging gesture. In one embodiment, the access control program may compute a first heartbeat signal from one or more facial data received by the front camera component as part of performing the facial recognition of the user. In at least one embodiment, the access control program may prompt the user to position a finger over a flash element of the rear camera component. The access control program may compute a second heartbeat signal from one or more finger data received by the rear camera component. Thereafter, the access control program may authenticate the user if the first heartbeat signal matches the second heartbeat signal.

According to one embodiment, the access control program may build and train a facial recognition model to determine whether a user may be identified as an authorized user with access to a secured computing functionality. During a training phase, the access control program may gather images and videos of the authorized user stored in the user device and/or in one or more social networks. Then, the access control program may perform segmentation for each image and video frame in the batch of gathered images and videos. In one embodiment, the access control program may analyze and extract features from a labeled image of the authorized user (e.g., retrieved via photo taken using the front camera component, selfie). Next, the access control program may utilize one or more computer vision algorithms to try and identify the authorized user in each image and video frame in the batch of gathered images and videos based on learning the extracted features from the labeled image of the authorized user. Using this process, the access control program may build the facial recognition model configured to identify the authorized user from an input image. In one embodiment, the access control program may train the facial recognition model to recognize various facial expressions and angles of the authorized user from the variations in the batch of gathered images and videos. The access control program may register the face/expression variations and store the trained facial recognition model in a knowledge database. Thereafter, the access control program may verify the accuracy of the trained facial recognition model based on a set of test images. The access control system may set a minimum accuracy threshold based on a consideration of a potential security risk associated with the secured computing functionality. In one embodiment, if the secured computing functionality is associated with a financial transaction (e.g., a bank loan, car lease), the access control system may set a minimum accuracy threshold of, for example, approximately 90%. If the trained facial recognition model is able to identify the authorized user in the set of test images with the minimum 90% accuracy, the access control program may conclude the training phase and inform the authorized user that training is complete. However, if the trained facial recognition model does not meet the minimum accuracy threshold, the access control program may perform a check to determine if there are more images and videos in the batch of gathered images and videos for training the facial recognition model. If more images and videos are pending in the batch of gathered images and videos, the access control program may continue the training phase with the next pending image or video. However, if there are no more available images or videos in the batch of gathered images and videos, and the trained facial recognition model has not met the minimum accuracy threshold, the access control program may create synthetic variations of the facial expressions/angles using the batch of gathered images and videos in order to further train the facial recognition model. Examples of algorithms which may be implemented to create the synthetic variations may include, but are not limited to, Generative Adversarial Networks (GANs).

According to at least another embodiment, in a working phase of the access control process, the access control program may instruct the user to position a finger over the rear camera component and flash element. Then, the access control program may cause the mobile device to activate the rear camera component and flash element and determine if a heartbeat is detected from the finger of the user positioned over the rear camera component and flash element. Once the heartbeat is detected from the finger of the user, the access control program may cause the mobile device to activate the front camera and perform facial recognition of the user via the trained facial recognition model. In one embodiment, the access control program may simultaneously implement the front camera to detect variations in the facial image and/or micromovements of the head in order to calculate a heartbeat from the facial image. Thereafter, the access control program provides the user with access to the secured computing functionality if the heartbeat frequency calculated from the rear camera component matches the heartbeat frequency calculated from the front camera component.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an access control program 110*a*. The networked computer environment 100 may also include a server 112 that is enabled to run an access control program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the access control program 110a, 110b may interact with a database 114 that may be embedded in various storage devices, such as, but not limited to a computer/mobile device 102, a networked server 112, or a cloud storage service.

Figure 2:
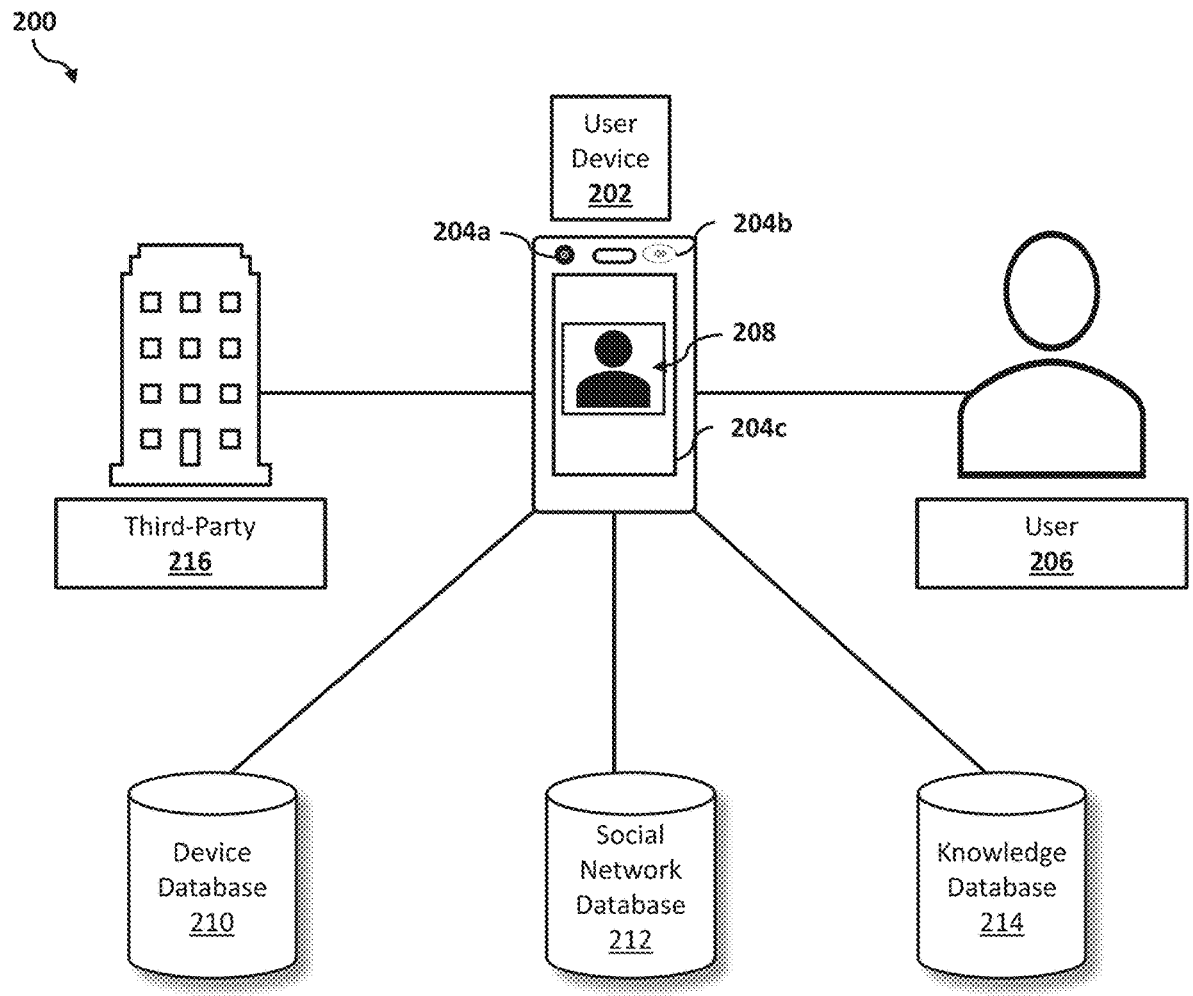
FIG. 2 is an exemplary illustration of an access control environment implemented into the networked computer environment depicted in FIG. 1, in accordance to at least one embodiment.

Referring now to FIG. 2, an exemplary illustration of an access control environment 200 in accordance with one embodiment is depicted.

Access control environment 200 may be provided in or be configured to communicate with the networked computer environment 100 via the communication network 116. Access control environment 200 may include a user device 202, similar to client computer 102, as depicted in FIG. 1. User device 202 may include, or be implemented into, for example, a mobile device (e.g., smart phone), a telephone, a wearable device (e.g., smart watch), a personal digital assistant, a netbook, a laptop computer, a tablet computer, a desktop computer, or any type of computing devices capable of running a program, accessing a network, and accessing a database.

According to one embodiment, the access control program 110a, 110b may be implemented via user device 202, client computer 102, server computer 112, or any other computing device located within communication network 116. Further, the access control program 110a, 110b may be implemented via distributed operations over multiple computing devices, such as user device 202, client computer 102, and server computer 112.

The access control program 110a, 110b running on the user device 202 may cause the user device 202 to challenge the authentication of a user 206 in response to the user 206 requesting access to a secured functionality of the user device 202. In one embodiment, the user device 202 may include one or more image capturing components, such as first device camera 204a and second device camera 204b. In one embodiment, the first device camera 204a may be provided as a front-facing camera of user device 202 and the second device camera 204b (illustrated with phantom lines) may be provided as a rear-facing camera of user device 202. In one embodiment, the first device camera 204a and the second device camera 204b may be provided as the front-facing camera of user device 202. In one embodiment, the first device camera 204a and the second device camera 204b may include a corresponding flash element. The first device camera 204a and the second device camera 204b may be provided to capture an image data 208 of the user 206 associated with an authentication challenge. In one embodiment, the image data 208 may include and/or refer to, for example, digital still image data, video data, digital video data, digital video stream data, digital video frame data, and real-time digital video data. As will be further detailed below with reference to FIG. 4, the first device camera 204a and the second device camera 204b may be configured to capture/compute a heartbeat signal (e.g., facial heartbeat signal, finger heartbeat signal) from the user 206 associated with the authentication challenge.

The access control program 110a, 110b may provide a user interface (UI) to prompt the user 206 (e.g., to perform authentication challenge) and accept commands and data inputs from the user 206. The UI provided by the access control program 110a, 110b may include, for example, a command line interface, a graphical user interface (GUI), a natural user interface (NUI), voice-user interface (VUI), a touch user interface (TUI), or a web-based interface. In at least one embodiment, user 206 may interact with the user interface via a display 204c of the user device 202.

According to at least one embodiment, the access control program 110a, 110b may provide a deep learning module for training one or more facial recognition algorithms (e.g., facial recognition model), as will be further detailed below with reference to FIG. 3. In order to train the facial recognition model, the access control program 110a, 110b may access image data stored in a device database 210 (e.g., image/video database of user device 202) which may be implemented into the database 114 and/or a cloud storage system. In one embodiment, the access control program 110a, 110b may also access an external source of image data, such as a social network database 212. The access control program 110a, 110b may store the facial recognition model and a knowledge source associated with the facial recognition training in a knowledge database 214 of the user device 202. The knowledge database 214 may be implemented into the database 114, device database 210, and/or a cloud storage system.

According to at least one embodiment, the access control environment 200 may include a third-party 216 (e.g., third-party computing device, third-party server) which may communicate with the user device 202 to challenge the authentication (e.g., via facial recognition verification, liveness detection, random gesture challenge) of the user 206 in response to the user 206 requesting access to a secured functionality provided by the third-party 216 via the user device 202.

According to the present embodiment, a user using user device 202 (e.g., client computer 102 or server computer 112) may use the access control program 110a, 110b (respectively) for authentication as an authorized user based on facial recognition verification, liveness detection, and gesture challenge recognition. The access control method is explained in more detail below with respect to FIGS. 3 to 5.

Figure 3:
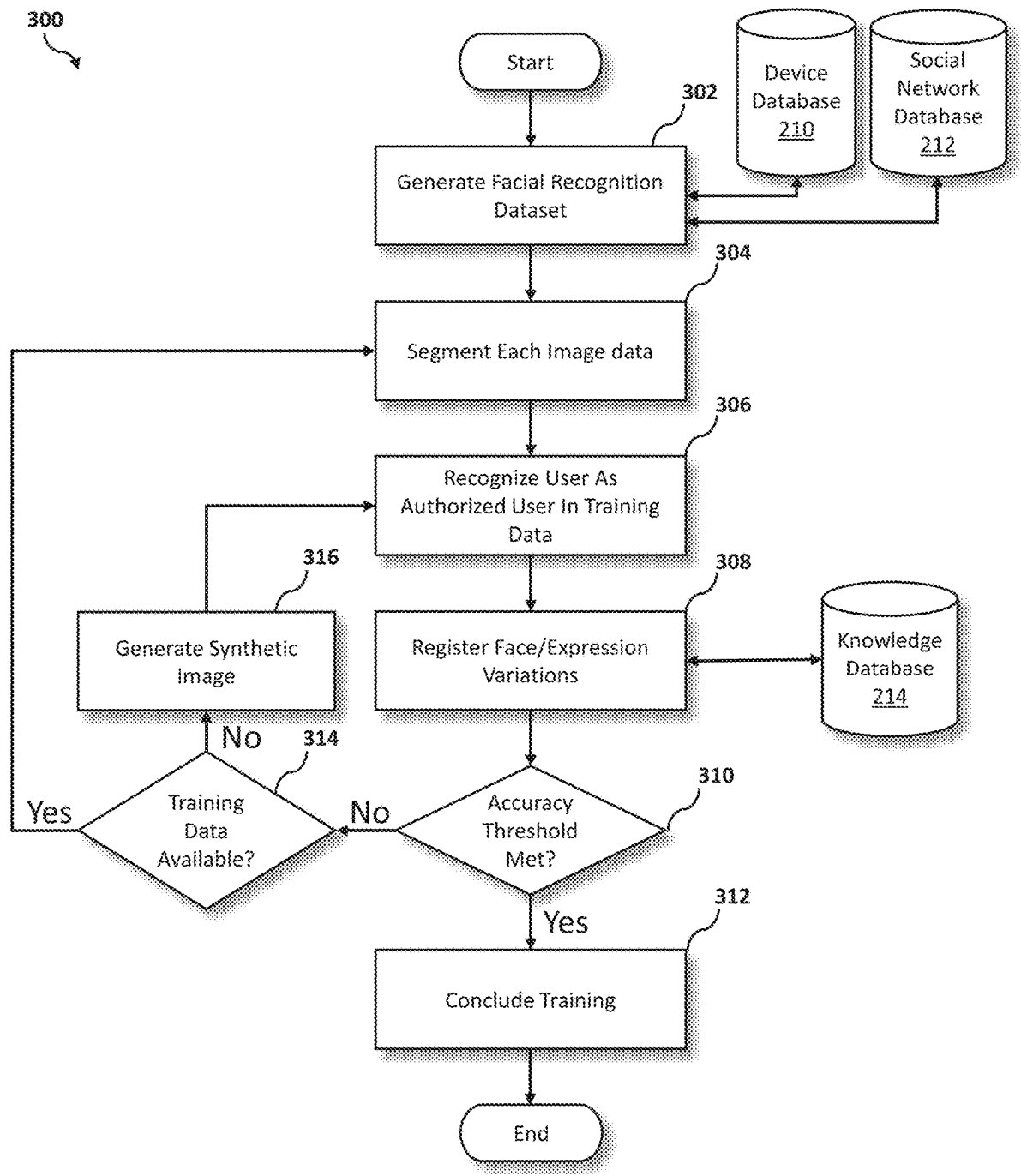
FIG. 3 is an operational flowchart illustrating a facial recognition training process for access control according to at least one embodiment.

Referring now to FIG. 3, an operational flowchart illustrating an exemplary facial recognition training process 300 used by the access control program 110a and 110b according to at least one embodiment is depicted.

At 302, a facial recognition dataset is generated. The access control program 110a, 110b running on the user device 202 may initiate the facial recognition training process 300 in response to receiving a user command to initialize an authorized user profile associated with the user 206 and user device 202.

According to one embodiment, after the authorized user profile is initiated (e.g., user 206 provides a username, password, and other security information), the access control program 110a, 110b may request permission (e.g., via user interface text box) from the user 206 to access one or more sources (e.g., device database 210, social network database 212) which may include the data necessary to train a facial recognition model to recognize the face of the user 206 as a representation of an authorized user with the required permissions to access one or more secured functionalities provided by the user device 202.

In response to receiving the requested permission from the user 206 (e.g., user 206 selecting "Permission Granted" button in the user interface), the access control program 110a, 110b may communicate with the device database 210 (e.g., via the operating system if device database 210 is embedded in user device 202; via communication network 116 if device database 210 is located remotely) and/or may communicate (e.g., via communication network 116) with the social network database 212 to retrieve one or more image data associated with the user 206 to generate the facial recognition dataset. For the purposes of this disclosure, image data may include and/or refer to digital still image data, digital video data, digital video stream data, and digital video frame data. In at least one embodiment, the access control program 110a, 110b may build and train a facial recognition model from the image data of the user 206 stored in the device database 210 and the social network database 212.

According to one embodiment, the access control program 110a, 110b may store the facial recognition dataset in a facial recognition directory generated in the device database 210. In one embodiment, the access control program 110a, 110b may divide (e.g., via 80/20 split) the facial recognition dataset into training data (e.g., for fitting/tuning the facial recognition model) and test data (e.g., for evaluating the facial recognition model). As such, the access control program 110a, 110b may implement the facial recognition directory to include a first subdirectory for storing the training data and a second subdirectory for storing the test data.

For example, a user 206 seeking to conduct financial transactions with a bank A via a mobile banking application installed on the user device 202, installs the access control program 110a, 110b on the user device 202 and initializes an authorized user profile associated with the user 206 and user device 202.

The user 206 interacts with the user interface of the access control program 110a, 110b to grant the access control program 110a, 110b the permission to access data stored in the device database 210 of the user device 202 and the social network database 212 associated with the user 206 to train a facial recognition model to recognize the face of the user 206 as a representation of an authorized user with the required permissions to access one or more secured functionalities provided by the mobile banking application installed on the user device 202.

The access control program 110a, 110b communicates with the device database 210 (via the operating system of the user device 202) and the social network database 212 associated with the user 206 and retrieves 100 image data associated with the user 206. Thereafter, the access control program 110a, 110b stores the facial recognition dataset (100 image data) in a facial recognition directory generated in the device database 210. Further, the access control program 110a, 110b divides the facial recognition dataset into 80 training data and 20 test data. Thereafter, the access control program 110a, 110b stores the 80 training data in a first subdirectory of the facial recognition directory and stores the 20 test data in a second subdirectory of the facial recognition directory.

Then, at 304, each image data is segmented. According to one embodiment, the access control program 110a, 110b may first train the facial recognition model to detect the segments or regions in the image data (e.g., digital still image data, digital video frame data) that represent a face. In one embodiment, the access control program 110a, 110b may convert the image data into a greyscale image and analyze each pixel in conjunction with adjacent pixels to determine various gradient patterns associated with the direction of the lights and shadows depicted in the greyscale image. Based on the gradient patterns, the access control program 110a, 110b may train the facial recognition model to detect various landmarks (e.g., facial features) that represent the face in the greyscale image of the image data.

Thereafter, the access control program 110a, 110b may segment each image data by electronically localizing (e.g., generating a bounding box using [x, y]-coordinates) the detected faces therein. In one embodiment, the access control program 110a, 110b may also subtract or crop out the regions (e.g., background) in each image data that fall outside of the electronically localized detected faces.

Continuing with the previous example, the access control program 110a, 110b executes a script to convert the image data stored in the facial recognition directory of the device database 210 into a greyscale image. Then, the access control program 110a, 110b analyzes each pixel in the greyscale image in conjunction with adjacent pixels to determine various gradient patterns associated with the direction of the lights and shadows depicted in the greyscale image. Next, the access control program 110a, 110b trains the facial recognition model to analyze the gradient patterns and detect various landmarks (e.g., facial features) that represent the face in the greyscale image of the image data. Thereafter, the access control program 110a, 110b electronically localizes the detected face by generating a bounding box indicated by [x, y]-coordinates around the detected face in the greyscale image. The access control program 110a, 110b loops through this step for each of the 100 image data stored in the facial recognition directory of the device database 210.

Then, at 306, the user is recognized as the authorized user in the training data. After electronically localizing the detected faces in the image data, the access control program 110a, 110b may utilize the training data portion of the facial recognition dataset to train the facial recognition model to identify the face of the user 206 and recognize the identified face of the user 206 as representing the authorized user.

The access control program 110a, 110b may utilize various computer-vision algorithms, such as convolutional neural networks (CNNs) (i.e., a deep learning algorithm which may automatically learn and extract the features in an input image and may be able to classify the image based on the extracted features), local binary patterns (LBP) (i.e., method of describing local structures in an image by comparing each pixel with the neighboring pixels), Haar Features (i.e., digital image features used in object recognition), active appearance models (AAMs) (i.e., generating a synthesized model of a shape of an object and fitting the synthesized model to various instances of the object), or any other suitable machine learning (ML) algorithm to train the facial recognition model to identify the detected faces in the training data as the face of the user 206 and recognize the identified face of the user 206 as representing the authorized user by association with one or more tagged image data of the authorized user.

In one embodiment, the access control program 110a, 110b may prompt the user 206 (e.g., via user interface text box) to capture and upload a real-time face image of the user 206 via the front-facing camera (e.g., first device camera 204a) or the rear-facing camera (e.g., second device camera 204b) of the user device 202. In response, the user 206 may interact with the user device 202 and cause the front-facing camera or the rear-facing camera to capture the requested real-time face image (e.g., a selfie). In one embodiment, the access control program 110a, 110b may store the captured real-time face image of the user 206, for example, in the device database 210, and may register the captured real-time face image of the user 206 as the tagged image data representing the authorized user. According to at least one embodiment, the access control program 110a, 110b may prompt the user 206 to provide the real-time face image when the authorized user profile is initiated. Then, the access control program 110a, 110b may register the real-time face image of the user 206 as the tagged image data representing the authorized user and may store the tagged image data with the authorized user profile in the device database 210.

According to one embodiment, the access control program 110a, 110b may utilize deep neural networks, such as a CNN, to recognize the detected faces as representations of the authorized user. In one embodiment, the access control program 110a, 110b may feed the training data into the CNN which may then output a quantified representation of each detected face in the training data. The quantified representation of each detected face may be returned from the CNN as a feature vector (e.g., multi-dimensional data) corresponding to embedded facial measurements (e.g., geometry of the facial elements, relative spatial location of the facial elements, three-dimensional geometry of the face, and other facial features) that may be unique to a specific face, such as the face of the user 206. Then, the access control program 110a, 110b may utilize the CNN to calculate the feature vector for the tagged image data associated with the authorized user.

Thereafter, the access control program 110a, 110b may utilize a support vector machine (SVM) or other similar classification algorithm to train the facial recognition model to classify the face of the user 206 as representing the authorized user based on determining a similarity in feature vectors after comparing of the feature vector outputs corresponding to the training data and the feature vector output corresponding to the tagged image data registered as the authorized user. Accordingly, the access control program 110a, 110b may train the facial recognition model to recognize the authorized user in image data including the detected face of the user 206. In one embodiment, the access control program 110a, 110b may store (e.g., via communication network 116) the trained facial recognition model in the knowledge database 214.

Continuing with the previous example, the access control program 110a, 110b instructs the user 206, via user interface box, to provide a real-time face image of the user 206 via the front-facing camera of the user device 202. The user 206 interacts with the user device 202 to cause the first device camera 204a (front-facing camera) to capture a selfie-image of the user 206. The access control program 110a, 110b stores the selfie-image of the user 206 in the device database 210 as the tagged image data representing the authorized user.

Then, the access control program 110a, 110b feeds the training data into a CNN which outputs a quantified representation of each detected face in the training data as a feature vector. Similarly, the access control program 110a, 110b feeds the tagged image data representing the authorized user into the CNN which outputs a corresponding feature vector for the tagged facial image of the authorized user. Next, the access control program 110a, 110b utilizes an SVM to train the facial recognition model to classify the detected faces in the training data as representing the authorized user based on similarities in the respective feature vectors. As such, the access control program 110a, 110b trains the facial recognition model to recognize the authorized user in image data including the detected face of the user 206. Thereafter, the access control program 110a, 110b transmits, via communication network 116, the trained facial recognition model for storage in the knowledge database 214.

Then, at 308, face/expression variations are registered. Once the facial recognition model begins to recognize the authorized user in the detected faces of the user 206 in the training data, the access control program 110a, 110b may continue to feed the facial recognition model with training data depicting multiple possibilities of facial expressions (e.g., gestures, emotions) and facial angles corresponding to the face of the user 206. Accordingly, the access control program 110a, 110b may train the facial recognition model to register the variances in the facial expressions and facial angles as corresponding to the authorized user. Then, the access control program 110a, 110b may communicate (e.g., via communication network 116) with the knowledge database 214 to build a knowledge source including the trained facial recognition model and the registered variances in facial expressions and facial angles associated with the authorized user.

Continuing with the previous example, the access control program 110a, 110b feeds the facial recognition model with training data depicting multiple profile views of the user 206 as well as various facial expressions and gestures. The access control program 110a, 110b trains the facial recognition model to register the variances in the facial expressions and facial angles as corresponding to the authorized user. Thereafter, the access control program 110a, 110b communicates, via communication network 116, with the knowledge database 214 and stores the registered variances in facial expressions and facial angles associated with the authorized user along with the trained facial recognition model.

Then, at 310, the access control program 110a, 110b determines if an accuracy threshold is met. The access control program 110a, 110b may perform a verification of the trained facial recognition model to determine if the trained facial recognition model is ready to be deployed. The access control program 110a, 110b may feed the trained facial recognition model with the test data (e.g., stored in the second subdirectory of the facial recognition directory in the device database 210) to determine if a facial recognition output meets a minimum accuracy threshold. In one embodiment, the access control program 110a, 110b may enable the third-party 216, requesting the authentication from the user 206, to implement a minimum third-party accuracy threshold (e.g., bank A may define a minimum accuracy threshold of 90% for loan/lease transactions). In one embodiment, the minimum accuracy threshold may be associated with a confidence score corresponding to a facial recognition prediction (e.g., the output) provided by the trained facial recognition model. According to another embodiment, the test data may include labels (e.g., name associated with the face) which may be compared to the facial recognition output of the trained facial recognition model to determine the accuracy of the facial recognition output. Thereafter, the access control program 110a, 110b may determine the accuracy of the trained facial recognition model based on the number of accurate facial recognition outputs returned by the trained facial recognition model.

Continuing with the previous example, the access control program 110a, 110b communicates with the device database 210, via communication network 116, and retrieves the test data including the 20 image data stored therein. Then, the access control program 110a, 110b feeds the test data into the trained facial recognition model stored in the knowledge database 214. The access control program 110a, 110b compares the facial recognition outputs of the trained facial recognition model with the respective names corresponding to the 20 image data included in the test data. Based on the comparison, the access control program 110a, 110b determines that the trained facial recognition model accurately recognized the user 206 as the authorized user in 19 out of the 20 test data.

If the access control program 110a, 110b determines that the accuracy threshold is met at 310, then the training is concluded at 312. In one embodiment, the access control program 110a, 110b may transmit an alert, via the user interface, to inform the user 206 that the facial recognition training process 300 is complete.

Continuing with the previous example, bank A server communicates with the access control program 110a, 110b running on the user device 202, via communication network 116, and implements a minimum third-party accuracy threshold of 90%. Based on the facial recognition outputs of the trained facial recognition model, the access control program 110a, 110b determines that the trained facial recognition model is able to accurately recognize the user 206 as the authorized user with a 95% accuracy rate in the test data. Therefore, the access control program 110a, 110b determines that the trained facial recognition model meets the 90% minimum third-party accuracy threshold implemented by bank A. Accordingly, the access control program 110a, 110b concludes the facial recognition training process 300 and transmits a message, via the user interface, to inform the user 206 that the facial recognition training process 300 is complete.

However, if the access control program 110a, 110b determines that the accuracy threshold is not met at 310, then the access control program 110a, 110b determines if further training data is available at 314.

Continuing with the previous example, the access control program 110a, 110b compares the facial recognition outputs of the trained facial recognition model with the respective names corresponding to the 20 test data at 310. Based on the comparison, the access control program 110a, 110b determines that the trained facial recognition model is able to accurately recognize the user 206 as the authorized user with an 85% accuracy rate in the test data. Therefore, at 310, the access control program 110a, 110b determines that the trained facial recognition model does not meet the 90% minimum third-party accuracy threshold implemented by bank A.

Thereafter, if the access control program 110a, 110b determines that further training data is available at 314, then the access control program 110a, 110b returns to 304 to continue training the facial recognition model using the pending training data in the first subdirectory of the facial recognition directory. In one embodiment, the access control program 110a, 110b may communicate (e.g., via the operating system or the communication network 116) with the device database 210 to check if the stored training data in the first subdirectory of the facial recognition directory includes any pending training data left to be ingested and analyzed by the facial recognition model.

Continuing with the previous example, the access control program 110a, 110b communicates, via the operating system of user device 202, with the device database 210 to check if further training data is available in the first subdirectory of the facial recognition directory. The access control program 110a, 110b identifies 13 training data in the first subdirectory of the facial recognition directory that have not been analyzed by the facial recognition model. Accordingly, the access control program 110a, 110b continues training the facial recognition model using the 13 pending training data.

However, if the access control program 110a, 110b determines that further training data is not available at 314, the access control program 110a, 110b generates a synthetic image at 316. If further training of the facial recognition model is required after ingesting and analyzing the training data stored in the first subdirectory of the facial recognition directory, the access control program 110a, 110b may manipulate (e.g., via variations in facial angles, poses, illumination) the original training data to generate a set of synthetic training data. In one embodiment, the access control program 110a, 110b may utilize a Generative Adversarial Networks (GANs) algorithm (i.e., algorithm that generates new features given a class) or any other suitable algorithm for creating the set of synthetic training data. Thereafter, the access control program 110a, 110b may return to 306 to train the facial recognition model to recognize the authorized user in the detected faces included in the synthetic training data.

Continuing with the previous example, the access control program 110a, 110b communicates, via the operating system of user device 202, with the device database 210 and determines that further training data is not available in the first subdirectory of the facial recognition directory. Accordingly, the access control program 110a, 110b utilizes a GANs algorithm to generate a set of synthetic training data including variations in the facial angles and poses depicted in the original training data. The synthetic data may comprise samples of the user displaying facial expressions not initially included in the training data. Thereafter, the access control program 110a, 110b trains the facial recognition model to recognize the authorized user in the detected faces of the user 206 included in the synthetic training data.

Figure 4:
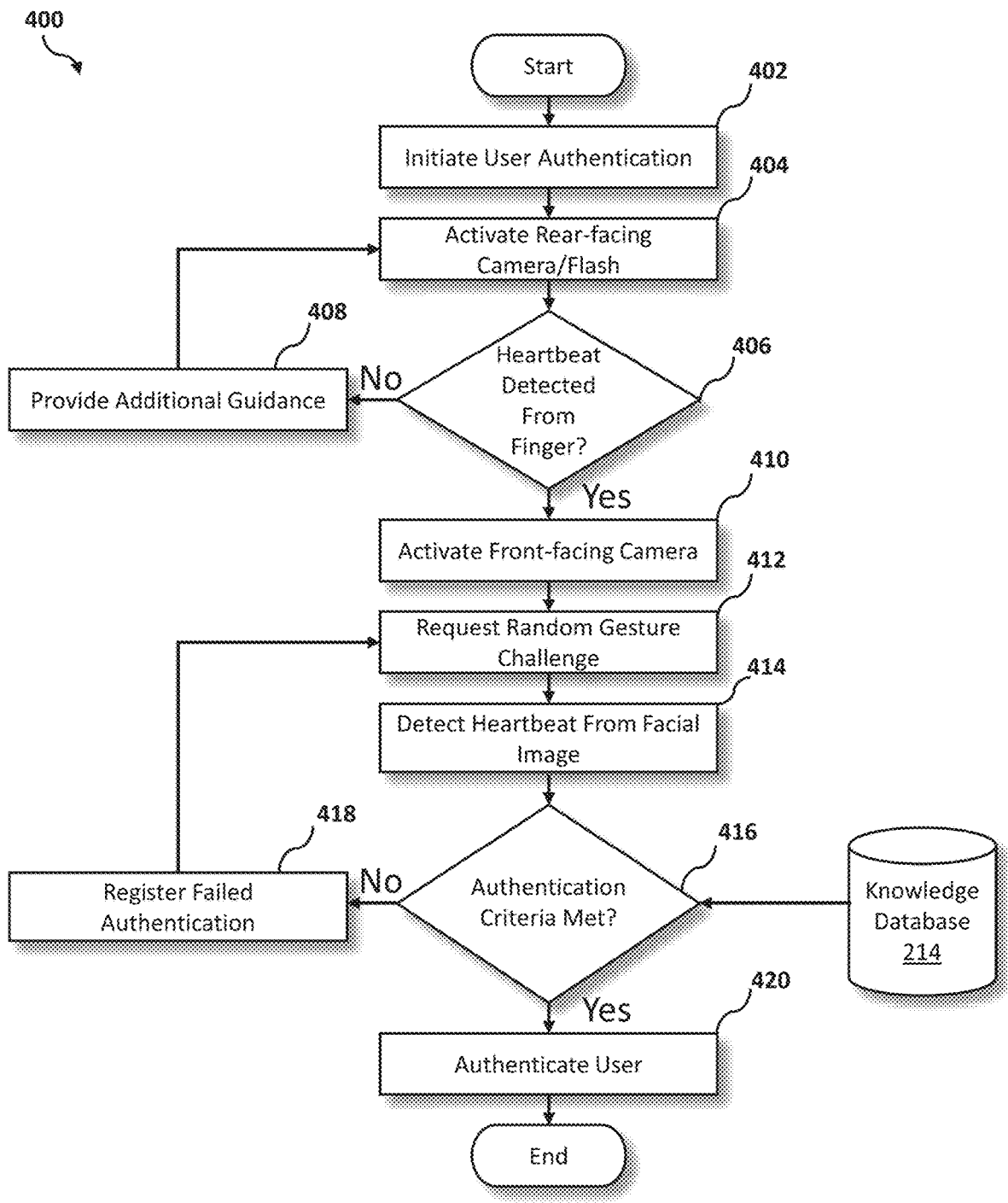
FIG. 4 is an operational flowchart illustrating an access control deployment process according to at least one embodiment.

Referring now to FIG. 4, an operational flowchart illustrating an exemplary access control deployment process 400 used by the access control program 110a and 110b according to at least one embodiment is depicted.

At 402, a user authentication is initiated. The access control program 110a, 110b running on the user device 202 may cause the user device 202 to initiate (e.g., challenge) the authentication of the user 206 in response to the user 206 requesting access to a secured functionality provided by the user device 202 (e.g., interacting with the user device 202 to perform a financial transaction with the bank A via the user device 202). The access control program 110a, 110b may be implemented as an authentication framework or mechanism for a third-party application (e.g., mobile banking application). In at least one embodiment, the access control program 110a, 110b may be integrated into the third-party application as an application programming interface (API), plugin, extension, or any suitable module.

When the user 206 initiates the third-party application (e.g., first opens the third-party application) or attempts to access a secured functionality that requires authentication permission (e.g., apply for bank loan via the third-party application), the third-party application may invoke (e.g., transmit a request via communication network 116) the access control program 110a, 110b to challenge the authentication of the user 206 to determine if the user 206 is the authorized user with adequate permissions to interact with the third-party application. In response, the access control program 110a, 110b may provide a prompt or message via the user interface of the third-party application to guide the user 206 through an authentication sequence. In one embodiment, the access control program 110a, 110b may provide a message (e.g., a dialog via user interface text box) which may instruct the user 206 to position a user finger (e.g., finger-tip) over the rear-facing camera and corresponding flash element (e.g., second device camera 204b) of the user device 202. In another embodiment, if the user device 202 includes the first device camera 204a and the second device camera 204b as multiple front-facing cameras of the user device 202, the access control program 110a, 110b may instruct the user 206 to position the user finger over one of the front-facing cameras of the user device 202.

For example, a mobile banking application associated with bank A is installed on the user device 202. The access control program 110a, 110b is integrated into the mobile banking application as an API configured to provide the authentication framework for the mobile banking application. When the user 206 interacts with the display 204c of the user device 202 and starts up the mobile banking application, the mobile banking application invokes, via communication network 116, the access control program 110a, 110b to challenge the authentication of the user 206 to determine if the user 206 is the authorized user with adequate permissions to interact with the mobile banking application. In response, the access control program 110a, 110b initiates a dialog, via a user interface text box, which instructs the user 206 to position a user finger-tip over the rear-facing camera and corresponding flash element of the user device 202.

Then, at 404, the rear-facing camera and flash element are activated. After the access control program 110a, 110b instructs the user 206 to position the user finger over the rear-facing camera and corresponding flash element of the user device 202, the access control program 110a, 110b may cause (e.g., via running a script) the user device 202 to activate the rear-facing camera and corresponding flash element (e.g., second device camera 204b). In one embodiment, the user device 202 may include an image sensor positioned proximate and/or implemented with the rear-facing camera which may detect the user finger and communicate with the access control program 110a, 110b to activate the rear-facing camera and corresponding flash element. In another embodiment, the user 206 may trigger the access control program 110a, 110b to activate the rear-facing camera and corresponding flash element, for example, by interacting with the user interface to confirm participation in the authentication sequence (e.g., clicking a "Start Authentication" button).

Activating the rear-facing camera and the corresponding flash element may include causing the flash element to emit a light beam and causing the rear-facing camera to detect reflected light beams. The flash element may be implemented as a light-emitting diode (LED), an incandescent light bulb, or any other suitable light source configured to illuminate the skin of the user finger positioned over the rear-facing camera and the corresponding flash element, as will be further detailed below.

Continuing with the previous example, after instructing the user 206 to position the user finger-tip over the rear-facing camera and corresponding flash element of the user device 202, the access control program 110a, 110b executes a script to cause the user device 202 to activate the rear-facing camera and corresponding flash element. In response, the flash element, including an LED light source, is activated to emit a light beam. In addition, the rear-facing camera is activated to detect reflected light beams.

Then, at 406, the access control program 110a, 110b determines if a heartbeat is detected from the user finger. The access control program 110a, 110b may include a physiological data sensing (PDS) module which may detect changes in one or more optical properties of skin tissue corresponding to a cardiac cycle and blood flowing through vasculature associated with the skin tissue (e.g., dermal vasculature) of the user finger. When the user finger is positioned over the rear-facing camera and the corresponding flash element of the user device 202, an image sensor associated with the rear-facing camera and corresponding flash element may contact the skin tissue of the user finger. As the flash element emits a light beam (e.g., light waves) towards the skin tissue of the user finger, the image sensor may detect and capture the light waves reflected from the skin tissue associated with changes in the blood flow. The image sensor may convert this information (e.g., variations in reflected light waves) into sensor data (e.g., finger image data) which may be transmitted to the PDS module. The PDS module may read and analyze (e.g., compare) the sensor data received from the image sensor to determine variations in the finger image data. The access control program 110a, 110b may determine that a heartbeat signal of the user 206 (e.g., first heartbeat signal) is detected if the PDS module determines variations in the finger image data received from the image sensor.

Continuing with the previous example, the user 206 positions the finger-tip of the user finger over the rear-facing camera and the corresponding flash element of the user device 202, such that the image sensor associated with the rear-facing camera and corresponding flash element is in contact with the skin tissue of the user finger. As the LED light source of the flash element emits a light beam towards the skin tissue of the user finger, the image sensor generates finger image data based on the light waves reflected from the skin tissue. Then, the image sensor transmits the finger image data to the PDS module. Thereafter, the PDS module compares the finger image data received from the image sensor to determine any variations in the finger image data.

If the access control program 110a, 110b determines that a heartbeat signal (e.g., first heartbeat signal) of the user 206 is not detected at 406, then the access control program 110a, 110b provides additional guidance at 408. According to one embodiment, if the user finger is not properly positioned over the rear-facing camera and the corresponding flash element of the user device 202, the image sensor may not capture accurate finger image data and therefore, the PDS module may not accurately determine any variations in the finger image data. As such, the access control program 110a, 110b may provide a visualization in the user interface of the user device 202 to illustrate proper positioning of the user finger over the rear-facing camera and the corresponding flash element of the user device 202. In one embodiment, the access control program 110a, 110b may implement the visualization to dynamically indicate (e.g., via changing colors) when proper positioning of the user finger over the rear-facing camera and the corresponding flash element of the user device 202 is detected. Thereafter, the access control program 110a, 110b may return to 404 in order to reattempt the detection of the heartbeat signal of the user 206.

Continuing with the previous example, the access control program 110a, 110b determines that a heartbeat signal of the user 206 (e.g., first heartbeat signal) is not detected due to improper positioning of the user finger over the rear-facing camera and the corresponding flash element of the user device 202. In response, the access control program 110a, 110b generates a visualization depicting proper positioning of the user finger over the rear-facing camera and the corresponding flash element of the user device 202. The access control program 110a, 110b provides the visualization in the user interface of the mobile banking application to guide the user 206 for proper positioning of the user finger. Then, the access control program 110a, 110b activates the rear-facing camera and corresponding flash element in order to reattempt the detection of the heartbeat signal of the user 206.

However, if the access control program 110a, 110b determines that the heartbeat signal of the user 206 is detected at 406, then the access control program 110a, 110b activates the front-facing camera at 410. According to one embodiment, if the PDS module analyzes the finger image data received from the image sensor and determines variations in the finger image data, the access control program 110a, 110b may determine that the heartbeat signal of the user 206 (e.g., first heartbeat signal) is detected from the user finger. In one embodiment, the access control program 110a, 110b may implement the PDS module to quantify the first heartbeat signal. The first heartbeat signal may be measured based on reading the variations in finger image data over a period of time and represented as a first pulse rate or similar metric (e.g., finger pulse rate or first heartbeat frequency).

Thereafter, the access control program 110a, 110b may cause (e.g., via running a script) the user device 202 to activate the front-facing camera (e.g., first device camera 204a). In one embodiment, the user 206 may trigger the access control program 110a, 110b to activate the front-facing camera, for example, by directing the face of the user 206 towards the front-facing camera. By activating the front-facing camera of the user device 202, the access control program 110a, 110b may cause the user device 202 to begin capturing face image data (e.g., image data 208). In at least one embodiment, the access control program 110a, 110b may cause the user device 202 to activate a flash element associated with the front-facing camera if the access control program 110a, 110b detects that the front-facing camera is not receiving adequate illumination from the environment.

Continuing with the previous example, after the user 206 properly positions the user finger over the rear-facing camera and the corresponding flash element of the user device 202, the PDS module analyzes the finger image data received from the image sensor and determines variations in the finger image data. As such, the access control program 110a, 110b determines that the first heartbeat signal of the user 206 is detected from the user finger. The access control program 110a, 110b utilizes the PDS module to quantify the first heartbeat signal. In response, the PDS module returns a first pulse rate of 70 beats per minute (bpm) or first heartbeat frequency of 1.16 hertz. Thereafter, the access control program 110a, 110b executes a script to cause the user device 202 to activate the front-facing camera and begin capturing a video data (e.g., real-time digital video data, face image data 208) associated with the user 206.

Then, at 412, a random gesture challenge is requested. After activating the front-facing camera of the user device 202, the access control program 110a, 110b may prompt the user 206 (e.g., via UI text box, VUI request) to perform one or more gesture challenges (e.g., a facial gesture action such as smiling, vocal action such as speaking a word/phrase). According to one embodiment, the access control program 110a, 110b may request a new random (e.g., unique, previously unseen by the user 206) gesture challenge each time the user 206 attempts an authentication using the access control program 110a, 110b. According to at least one embodiment, the requested random gesture challenges may include an expected response associated with the authorized user. In one embodiment, the expected response may be synthetic variations of images already registered in the knowledge base 214.

Continuing with the previous example, after activating the front-facing camera of the user device 202, the access control program 110a, 110b prompts the user 206, via UI text box, to blink three times and perform a smile gesture. Additional embodiments may include one or more types of prompts, such as audio, video, still image, or animations.

Then, at 414, a heartbeat is detected from the face image data. As the user 206 performs the requested gesture challenges, the access control program 110a, 110b may analyze the video data (e.g., real-time digital video data, face image data 208) depicting a user response to the requested gesture challenges to determine that a second heartbeat signal of the user 206 is detected based on variations in the video data.

In one embodiment, the access control program 110a, 110b may detect the second heartbeat signal from the video data in a manner similar to detecting the first heartbeat signal from sensor data associated with the variations in the finger image. That is, the PDS module may analyze the video data received from the front-facing camera and may determine variations in the video data corresponding to light waves reflected from the skin tissue of the face associated with changes in the blood flow. In another embodiment, the access control program 110a, 110b may detect the second heartbeat signal from the video data based on measuring micromovements of the head (e.g., components of the head) associated with an influx of blood during the cardiac cycle. In one embodiment, the access control program 110a, 110b may implement the PDS module to quantify the second heartbeat signal. The second heartbeat signal may be measured based on reading the variations in video data over a period of time and represented as a second pulse rate or similar metric (e.g., face pulse rate or second heartbeat frequency).

Continuing with the previous example, the PDS module analyzes the video data received from the front-facing camera and determines variations in the video data. As such, the access control program 110a, 110b determines that the second heartbeat signal of the user 206 is detected from the face of the user. The access control program 110a, 110b utilizes the PDS module to quantify the second heartbeat signal. In response, the PDS module returns a second pulse rate of 75 bpm or second heartbeat frequency of 1.25 hertz.

Thereafter, at 416, the access control program 110*a*, 110*b* determines if the authentication criteria are met. According to one embodiment, authentication may be triggered if the authorized user of the user device 202 is recognized from the face of the user 206 depicted in the video data (e.g., first criteria, first match) and the first heartbeat signal measured from the sensor data (e.g., finger image data) matches the second heartbeat signal measured from the video data associated with the face of the user 206 (e.g., second criteria, second match) to verify that the user 206 seeking authentication is a living person.

According to one embodiment, the access control program 110*a*, 110*b* may utilize the trained facial recognition model (e.g., stored in the knowledge database 214) to perform facial recognition in a manner similar to the process detailed at 304 and 306 of the facial recognition training process 300. Initially, the access control program 110*a*, 110*b* may utilize the trained facial recognition model to detect and electronically localize (e.g., via generating a bounding box using [x, y]-coordinates) the face in the captured video data. Next, the access control program 110*a*, 110*b* may utilize the trained facial recognition model to calculate a feature vector corresponding to embedded facial measurements of the detected face in the captured video data. Then, the trained facial recognition model may compare the feature vector from the captured video data with the feature vector associated with the authorized user (stored in the knowledge database 214), to determine if the captured video data represents the authorized user within a minimum accuracy threshold, such as a pre-defined margin of error (e.g., 3% error) which may be set by the third-party.

According to one embodiment, the access control program 110*a*, 110*b* may compare the first heartbeat signal and the second heartbeat signal to determine if the first heartbeat signal matches the second heartbeat signal within a pre-determined threshold (e.g., pre-determined pulse rate threshold, pre-determined frequency threshold). In at least one embodiment, the pre-determined threshold may be set by the third-party.

In at least one embodiment, authentication may also require that the user response to the gesture challenges depicted in the video data (e.g., real-time digital video data, face image data 208) matches an expected response to satisfy the random gesture challenge requested by the access control program 110*a*, 110*b* (e.g., third criteria, third match). The random gesture challenge requirement, in conjunction with the facial recognition verification and the liveness detection, may provide a robust anti-spoofing authentication mechanism. In other words, an unauthorized user may not be able to synthetically generate, in real-time, two videos that simulate fake pulse rate information, where one video must depict the representation of the authorized user and simultaneously satisfy the random gesture challenge requested by the access control program 110*a*, 110*b*.

If the access control program 110*a*, 110*b* determines that the authentication criteria are not met at 416, then the access control program 110*a*, 110*b* registers the failed authentication at 418 and returns to 412 to request a different random gesture challenge. In one embodiment, the access control program 110*a*, 110*b* may communicate (e.g., via communication network 116) with the third-party to register the failed authentication of the user 206. In one embodiment, the access control program 110*a*, 110*b* may communicate the failed authentication to the user 206 via the UI of the user device 202. In at least one embodiment, the access control program 110*a*, 110*b* may cause the user device 202 to lock out the user 206 (e.g., from the third-party application) after a pre-determined number of failed authentications attempts which may be set by the third-party.

Continuing with the previous example, an unauthorized user attempts to authenticate using synthetically generated videos of the authorized user depicting skin color variations that simulate fake pulse rate information. Based on the synthetically generated videos, the access control program 110*a*, 110*b* determines that the authorized user is recognized, and the first heartbeat signal matches the second heartbeat signal within the pre-determined frequency threshold. However, because the synthetically generated videos of the authorized user did not include an expected response to the random gesture challenge (blink three times and smile gesture) requested by the access control program 110*a*, 110*b*, the access control program 110*a*, 110*b* determines that the authentication criteria are not met. As such, the access control program 110*a*, 110*b* communicates, via communication network 116, with the bank A to register the failed authentication of the unauthorized user.

However, if the access control program 110*a*, 110*b* determines that the authentication criteria are met at 416, then the access control program 110*a*, 110*b* authenticates the user at 420. In one embodiment, the access control program 110*a*, 110*b* may unlock the third-party application (e.g., mobile banking application) to provide the user 206 with access to a secured functionality of the third-party application. In at least one embodiment, the access control program 110*a*, 110*b* may transmit (e.g., via communication network 116) a message or alert to the third-party 216 and/or the user 206 indicating that the authentication is completed successfully.

Continuing with the previous example, the access control program 110*a*, 110*b* determines that the authorized user of the user device 202 is recognized from the face of the user 206 depicted in the video data and the first heartbeat signal (1.16 hertz) matches the second heartbeat signal (1.25 hertz) within the pre-determined frequency threshold set by the bank A. In addition, the access control program 110*a*, 110*b* determines that the video data depicted the user 206 performing the random gesture challenge (three blinks and smile gesture) requested by the access control program 110*a*, 110*b*. As such, the access control program 110*a*, 110*b* authenticates the user 206 and unlocks the mobile banking application for access by the user 206.

Figure 5:
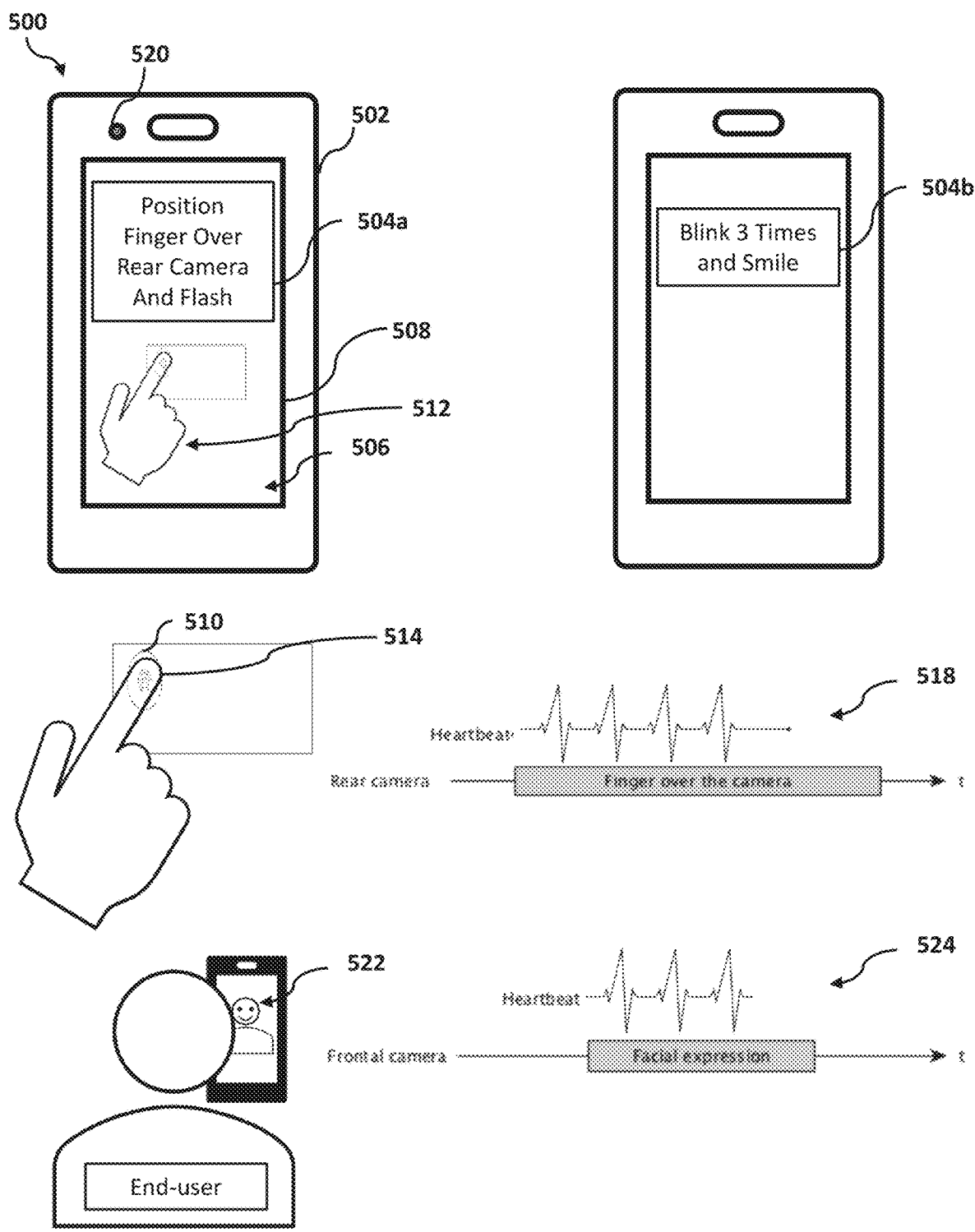
FIG. 5 is a block diagram illustrating an exemplary access control process according to at least one embodiment.

Referring now to FIG. 5, a block diagram illustrating an exemplary access control process 500 implemented by the access control program 110*a*, 110*b* according to at least one embodiment is depicted.

The access control program 110*a*, 110*b* running on a mobile device 502 may initiate an authentication sequence of an end-user in response to the end-user requesting access to a mobile banking application installed on the mobile device 502. The access control program 110*a*, 110*b* provides a message, via a first text box 504*a* in a UI 506 of the mobile banking application. The first text box 504*a* is transmitted to a display 508 of the mobile device 502 and instructs the end-user to "Position Finger Over Rear Camera and Flash". Then, the access control program 110*a*, 110*b* may cause the mobile device 502 to activate a rear camera 510 including a flash element. In one embodiment, the access control program 110*a*, 110*b* may provide a dynamic visualization 512 in the UI 506 to guide proper positioning of the user finger over the rear-facing camera and the corresponding flash element of the user device 502. In response, the end-user positions a finger-tip 514 of the user finger over the rear camera 510 and corresponding flash element of the mobile device 502.

The access control program 110a, 110b may implement the PDS module to measure a first heartbeat signal 518 based on reading the variations in finger image data received from the rear camera 510 and corresponding flash element over a period of time. In one embodiment, the access control program 110a, 110b may activate a front camera 520 of the mobile device 502. Then, the access control program 110a, 110b may prompt the end-user, via a second text box 504b in the UI 506 of the mobile banking application to perform one or more gesture challenges.

As the end-user performs the requested gesture challenges, the access control program 110a, 110b analyzes a video data 522 depicting the end-user response to the gesture challenge and determines that the depicted response matches an expected response to satisfy the random gesture challenge requested via the second text box 504b in the UI 506 of the mobile banking application. Based on the video data 522 depicting the face of the end-user, the access control program 110a, 110b determines that a second heartbeat signal 524 of the end-user is detected. Then, the access control program 110a, 110b compares the first heartbeat signal 518 and the second heartbeat signal 524 and determines that the first heartbeat signal 518 matches the second heartbeat signal 524 within a pre-determined threshold set by a third-party associated with the mobile banking application. Further, the access control program 110a, 110b determines that an authorized user of the mobile device 502 is recognized from the face of the end-user depicted in the video data 522.

Accordingly, the access control program 110a, 110b determines that a totality of authentication criteria are met to trigger the authentication of the end-user for access to the mobile banking application.

The functionality of a computer may be improved by the access control program 110a, 110b because the access control program 110a, 110b may prevent an unauthorized user from gaining access to a secured functionality of the computer using a synthetically generated image or video of an authorized user. The access control program 110a, 110b may request a random gesture challenge from a user seeking access to the secured functionality of the computer. The access control program 110a, 110b may analyze a user response included in a real-time video data from a camera of the computer to determine if the user response matches an expected response associated with the authorized user. The access control program 110a, 110b may utilize the same video data to determine if a detected face in the video data matches a representation of the authorized user. Further, the access control program 110a, 110b may utilize the same video data to measure a heartbeat signal from the detected face in the video data. Simultaneously, the access control program 110a, 110b may utilize another sensor of the computer to measure a second heartbeat signal from the user, which may then be compared to the heartbeat signal from the video data to determine a matching heartbeat signal.

By implementing the multi-factor authentication mechanism provided by the access control program 110a, 110b, the unauthorized user may not be able to synthetically generate, in real-time, two videos that simulate fake heartbeat signal information, where one video must depict the representation of the authorized user and simultaneously satisfy the random gesture challenge requested by the access control program 110a, 110b.

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

Figure 6:
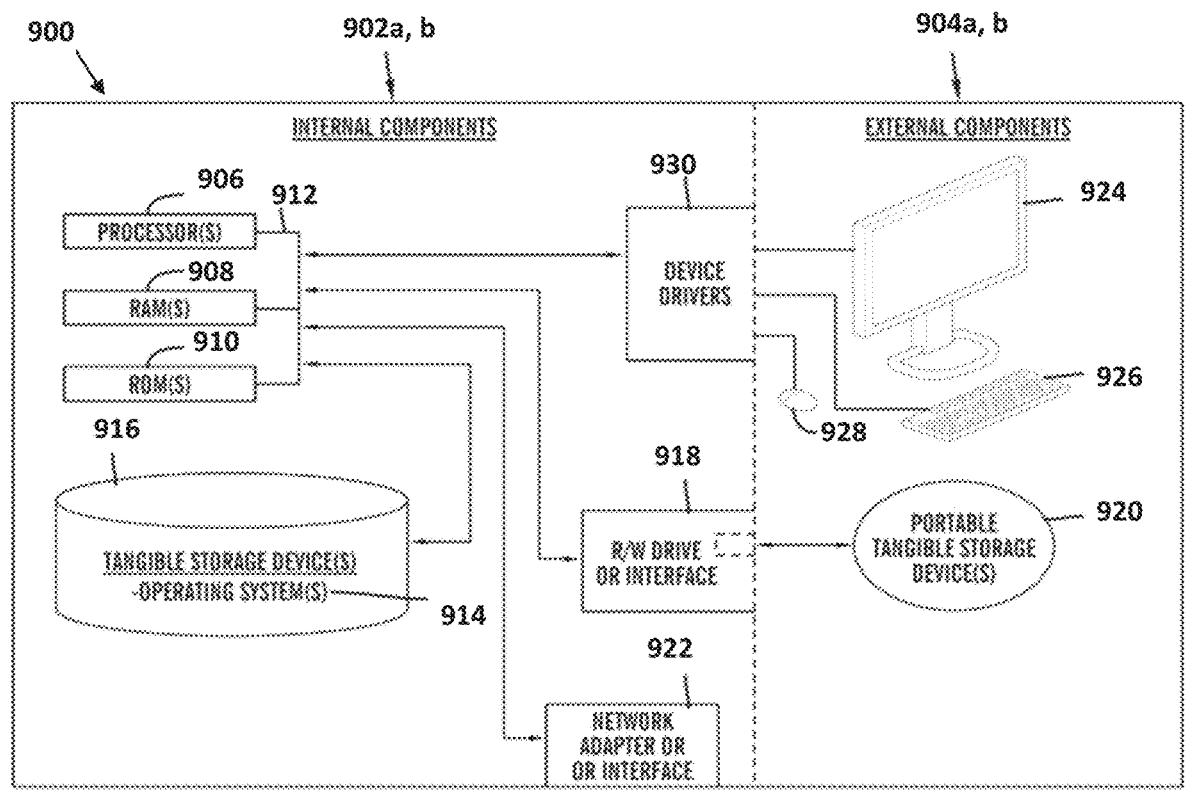
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 6. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the access control program 110a in client computer 102, and the access control program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the access control program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the access control program 110a in client computer 102 and the access control program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the access control program 110*a* in client computer 102 and the access control program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
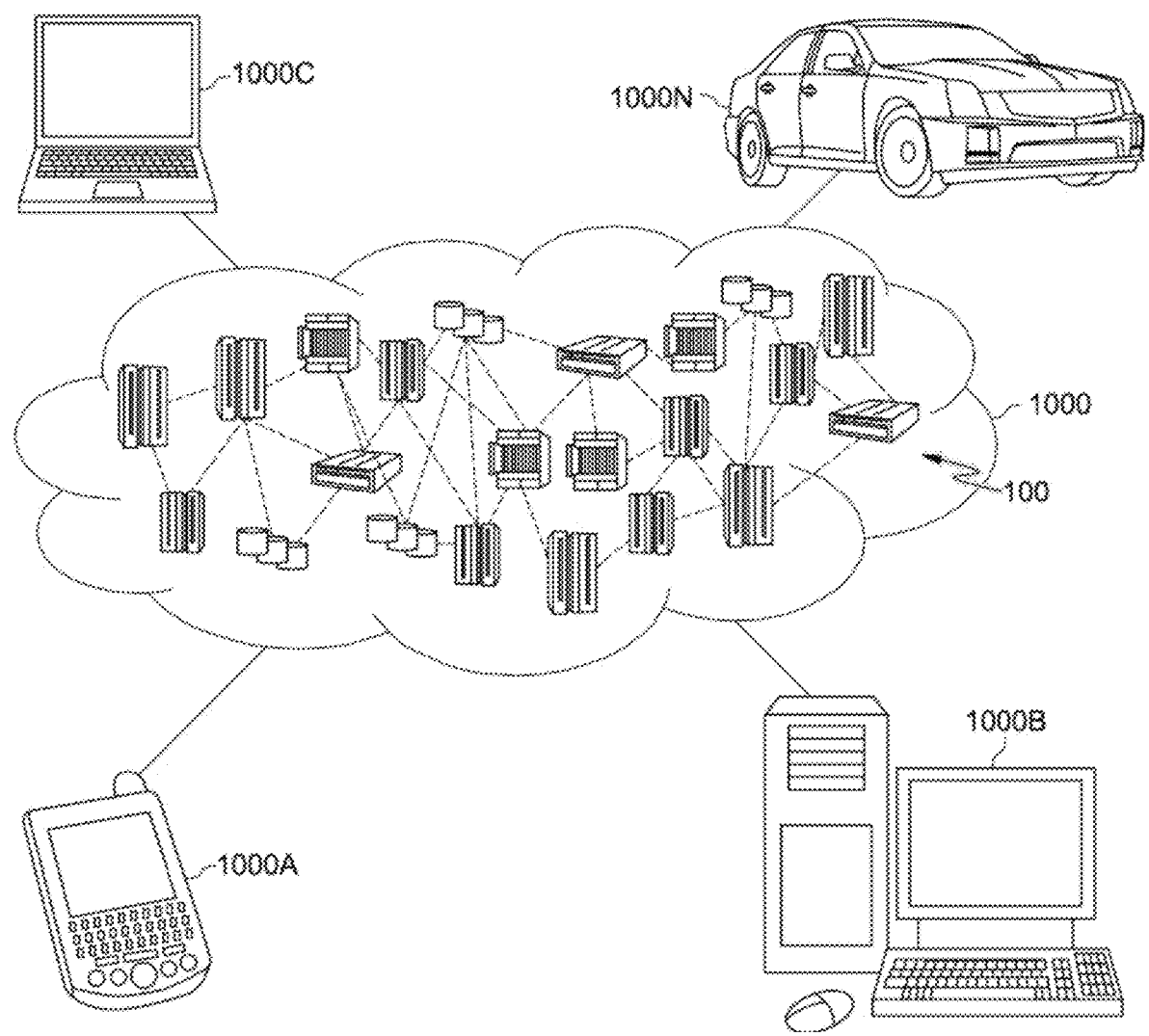
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
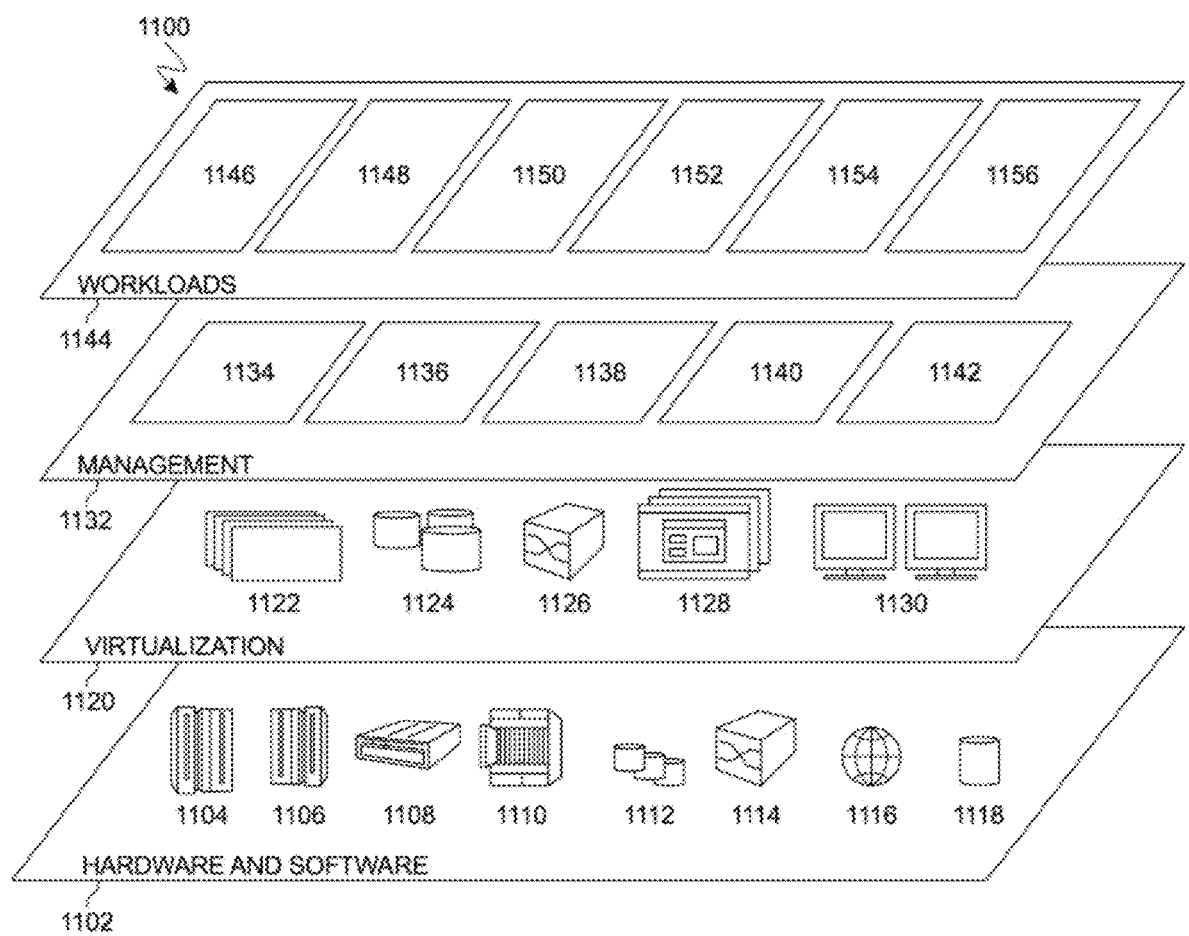
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and access control 1156. An access control program 110a, 110b provides a way to prevent unauthorized access to a secured functionality of a computer by implementing authentication based on facial recognition verification, liveness detection, and random gesture challenge recognition.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for access control, the method comprising:
  prompting, using a user interface (UI) of a user device, a user to position a finger of the user over a rear-facing camera of the user device;
  activating the rear-facing camera of the user device to measure a first heartbeat signal from the finger of the user;
  in response to detecting the first heartbeat signal from the finger of the user positioned over the activated rear-facing camera of the user device, activating a front-facing camera of the user device;
  requesting, using the UI of the user device, a random gesture challenge from the user interacting with the user device, wherein the requested random gesture challenge includes an expected response associated with an authorized user of the user device;
  in response to receiving a video data from the activated front-facing camera of the user device, determining whether the received video data includes a user response matching the expected response associated with the authorized user of the user device, wherein the user response matching the expected response associated with the authorized user of the user device is associated with a first criteria for authentication;
  determining whether a detected face in the received video data matches a representation of the authorized user of the user device, wherein the detected face in the received video data matching the representation of the authorized user of the user device is associated with a second criteria for authentication;
  determining whether the first heartbeat signal from the finger of the user matches a second heartbeat signal of the user, wherein the second heartbeat signal is measured based on the received video data from the activated front-facing camera of the user device, wherein a match between the first heartbeat signal and the second heartbeat signal is associated with a third criteria for authentication; and
  in response to determining that the first criteria for authentication, the second criteria for authentication, and the third criteria for authentication are met simultaneously, authenticating the user as the authorized user of the user device.

2. The method of claim 1, further comprising:
  measuring the first heartbeat signal of the user based on a sensor data from a sensor of the user device interacting with the finger of the user.

3. The method of claim 1, further comprising:
  measuring the first heartbeat signal of the user based on at least one image data from the activated rear-facing camera of the user device interacting with the finger of the user.

4. The method of claim 1, wherein the requested random gesture challenge is selected from the group consisting of speaking a phrase and performing a facial gesture.

5. The method of claim 1, further comprising:
  measuring the first heartbeat signal and the second heartbeat signal simultaneously with the user response to the requested random gesture challenge.

6. The method of claim 1, further comprising:
in response to determining at least one of: a first mismatch between the user response included in the received video data and the expected response associated with the authorized user, a second mismatch between the first heartbeat signal and the second heartbeat signal, and a third mismatch between the detected face in the received video data and the representation of the authorized user, registering a failed authenticating of the user as the authorized user of the user device.

7. The method of claim 6, further comprising:
in response to registering the failed authenticating of the user as the authorized user of the user device, requesting, using the UI of the user device, a new random gesture challenge from the user interacting with the user device.

8. The method of claim 7, wherein the new requested random gesture challenge is previously unseen by the user interacting with the user device.

9. The method of claim 7, wherein the new requested random gesture challenge includes a new expected response associated with the authorized user of the user device.

10. A computer system for access control, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
prompting, using a user interface (UI) of a user device, a user to position a finger of the user over a rear-facing camera of the user device;
activating the rear-facing camera of the user device to measure a first heartbeat signal from the finger of the user;
in response to detecting the first heartbeat signal from the finger of the user positioned over the activated rear-facing camera of the user device, activating a front-facing camera of the user device;
requesting, using the UI of the user device, a random gesture challenge from the user interacting with the user device, wherein the requested random gesture challenge includes an expected response associated with an authorized user of the user device;
in response to receiving a video data from the activated front-facing camera of the user device, determining whether the received video data includes a user response matching the expected response associated with the authorized user of the user device, wherein the user response matching the expected response associated with the authorized user of the user device is associated with a first criteria for authentication;
determining whether a detected face in the received video data matches a representation of the authorized user of the user device, wherein the detected face in the received video data matching the representation of the authorized user of the user device is associated with a second criteria for authentication;
determining whether the first heartbeat signal from the finger of the user matches a second heartbeat signal of the user, wherein the second heartbeat signal is measured based on the received video data from the activated front-facing camera of the user device, wherein a match between the first heartbeat signal and the second heartbeat signal is associated with a third criteria for authentication; and
in response to determining that the first criteria for authentication, the second criteria for authentication, and the third criteria for authentication are met simultaneously, authenticating the user as the authorized user of the user device.

11. The computer system of claim 10, further comprising:
measuring the first heartbeat signal of the user based on a sensor data from a sensor of the user device interacting with the finger of the user.

12. The computer system of claim 10, further comprising:
measuring the first heartbeat signal of the user based on at least one image data from the activated rear-facing camera of the user device interacting with the finger of the user.

13. The computer system of claim 10, wherein the requested random gesture challenge is selected from the group consisting of speaking a phrase and performing a facial gesture.

14. The computer system of claim 10, further comprising:
measuring the first heartbeat signal and the second heartbeat signal simultaneously with the user response to the requested random gesture challenge.

15. A computer program product for access control, comprising:
one or more computer-readable tangible storage media and program instructions stored on at least one of the one or more computer-readable tangible storage media, the program instructions executable by a processor to cause the processor to perform a method comprising:
prompting, using a user interface (UI) of a user device, a user to position a finger of the user over a rear-facing camera of the user device;
activating the rear-facing camera of the user device to measure a first heartbeat signal from the finger of the user;
in response to detecting the first heartbeat signal from the finger of the user positioned over the activated rear-facing camera of the user device, activating a front-facing camera of the user device;
requesting, using the UI of the user device, a random gesture challenge from the user interacting with the user device, wherein the requested random gesture challenge includes an expected response associated with an authorized user of the user device;
in response to receiving a video data from the activated front-facing camera of the user device, determining whether the received video data includes a user response matching the expected response associated with the authorized user of the user device, wherein the user response matching the expected response associated with the authorized user of the user device is associated with a first criteria for authentication;
determining whether a detected face in the received video data matches a representation of the authorized user of the user device, wherein the detected face in the received video data matching the representation of the authorized user of the user device is associated with a second criteria for authentication;
determining whether the first heartbeat signal from the finger of the user matches a second heartbeat signal of the user, wherein the second heartbeat signal is measured based on the received video data from the activated front-facing camera of the user device, wherein a match between the first heartbeat signal and the second heartbeat signal is associated with a third criteria for authentication; and in response to determining that the first criteria for authentication, the second criteria for authentication, and the third criteria for authentication are met simultaneously, authenticating the user as the authorized user of the user device.

16. The computer program product of claim 15, further comprising:

measuring the first heartbeat signal of the user based on a sensor data from a sensor of the user device interacting with the finger of the user.

17. The computer program product of claim 15, further comprising:

measuring the first heartbeat signal of the user based on at least one image data from the activated rear-facing camera of the user device interacting with the finger of the user.

\* \* \* \* \*